(12) United States Patent
Sugiyama et al.

(10) Patent No.: US 8,864,591 B2
(45) Date of Patent: Oct. 21, 2014

(54) PROPELLER SHAFT AND CONSTANT VELOCITY UNIVERSAL JOINT USED THEREIN

(71) Applicant: Hitachi Automotive Systems Kyushu, Ltd., Fukuoka (JP)

(72) Inventors: Kenichi Sugiyama, Atsugi (JP); Takahiro Kuroha, Atsugi (JP); Hiromichi Komai, Hadano (JP); Yasutomo Mabe, Isehara (JP); Yasushi Akita, Atsugi (JP)

(73) Assignee: Hitachi Automotive Systems Kyushu, Ltd., Fukuoka (JP)

( * ) Notice: Subject to any disclaimer, the term of this patent is extended or adjusted under 35 U.S.C. 154(b) by 0 days.

(21) Appl. No.: 13/798,480

(22) Filed: Mar. 13, 2013

(65) Prior Publication Data

US 2013/0252748 A1 Sep. 26, 2013

(30) Foreign Application Priority Data

Mar. 22, 2012 (JP) ................................ 2012-066120

(51) Int. Cl.
*F16D 1/116* (2006.01)
*F16C 1/04* (2006.01)
*F16B 21/18* (2006.01)
*F16D 3/223* (2011.01)
*F16D 3/84* (2006.01)

(52) U.S. Cl.
CPC ............... *F16C 1/04* (2013.01); *F16D 2300/08* (2013.01); *F16B 21/183* (2013.01); *F16D 2003/22313* (2013.01); *F16D 3/223* (2013.01); *F16D 1/116* (2013.01); *F16D 3/845* (2013.01); *Y10S 464/906* (2013.01)
USPC .......................... 464/173; 464/906; 403/359.5

(58) Field of Classification Search
USPC ................ 464/173, 182, 904–906; 403/359.5
See application file for complete search history.

(56) References Cited

U.S. PATENT DOCUMENTS

| | | | | |
|---|---|---|---|---|
| 3,822,570 | A | * | 7/1974 | Fisher ........................ 464/173 X |
| 4,869,556 | A | * | 9/1989 | Gees |
| 7,470,198 | B2 | | 12/2008 | Cermak |
| 7,677,984 | B2 | * | 3/2010 | Hahn et al. .................... 464/182 |
| 7,712,994 | B2 | * | 5/2010 | Cermak | |

* cited by examiner

*Primary Examiner* — Gregory Binda
(74) *Attorney, Agent, or Firm* — Crowell & Moring LLP

(57) ABSTRACT

A propeller shaft is proposed which comprises an inner cylindrical member that has a center through bore into which a shaft is inserted; an outer cylindrical member disposed around the inner cylindrical member; a torque transmitting unit operatively disposed between the inner and outer cylindrical members; a sleeve member coaxially connected to the center through bore of the inner cylindrical member; a boot unit arranged to hermetically close one open side of an interior of the outer cylindrical member; and a positioning mechanism that effects a relative axial positioning between the shaft and the inner cylindrical member when a splined cylindrical outer wall of the shaft is inserted through the sleeve member into a given position of a splined cylindrical inner wall of the center through bore of the inner cylindrical member.

8 Claims, 6 Drawing Sheets

PROPELLER SHAFT AND CONSTANT VELOCITY UNIVERSAL JOINT USED THEREIN

BACKGROUND OF THE INVENTION

1. Field of the Invention

The present invention relates to a propeller shaft and a constant velocity universal joint used therein, which are used in wheeled motor vehicles.

2. Description of the Related Art

Usually, the propeller shaft for the wheeled motor vehicle has a split construction including a drive shaft that is adapted to connect to an output shaft of a transmission, a driven shaft that is adapted to connect to a differential gear and a coupling device, such as, constant velocity universal joint, Cardin joint or the like, that is operatively disposed between mutually facing ends of the drive and driven shafts. In practical use, an axially middle portion of the propeller shaft is rotatably held by a support device fixed to a body of the vehicle. Furthermore, for holding a grease in the coupling device, there is provided a boot between the drive shaft and the coupling device.

One of such boots is disclosed by U.S. Pat. No. 7,470,198. The boot disclosed by the patent is generally conical in shape and made of a soft rubber or flexible plastic. A larger diameter outer portion of the boot is secured to an outer cylindrical member of a constant velocity universal joint (viz., coupling device) through an annular metal retainer and a smaller diameter inner portion of the boot is secured to the drive shaft through an annular metal band. With provision of the boot, an interior of the constant velocity universal joint is protected from entry of muddy water, dusts and the like and furthermore a grease in the interior is suppressed from leakage.

SUMMARY OF THE INVENTION

However, usage of the boot for protecting the interior of the universal joint from entry of foreign matter has the following drawbacks. That is, it often happens that fitting the boot to a desired position of the propeller shaft takes a lot of time due to a complicated fitting process.

That is, at first, the boot is fixed at its larger diameter outer portion to an outer cylindrical member of the universal joint to produce a semifinished unit of a propeller shaft. Usually, this fitting process is carried out in an automotive component factory. Then, the semifinished unit is transported to a vehicle assembling factory. At this assembling factory, the semifinished unit of propeller shaft is connected to a vehicle body and then the smaller diameter inner portion of the boot is fixed to a drive shaft (viz., output shaft of a transmission).

As will be understood from the above, such fitting process is troublesome and thus takes a lot of time thereby causing increase in production cost of the vehicle.

Accordingly, the present invention is provided by taking the above-mentioned drawbacks of the conventional technology into consideration and aims to provide a propeller shaft that is free of the above-mentioned drawbacks.

In accordance with a first aspect of the present invention, there is provided a propeller shaft which comprises an inner cylindrical member having a center through bore, the center through bore having a splined cylindrical inner wall with which a splined cylindrical outer wall of a shaft is engaged; an outer cylindrical member disposed around the inner cylindrical member; a torque transmitting unit installed between the inner and outer cylindrical members to transmit a torque between the inner and outer cylindrical members; a sleeve member coaxially connected to the center through bore of the inner cylindrical member, the sleeve member permitting passage of the splined cylindrical outer wall of the shaft therethrough before effecting the engagement between the splined cylindrical outer wall of the shaft and the splined cylindrical inner wall of the inner cylindrical member; a boot unit having one end fixed to the outer cylindrical member and the other end fixed to the sleeve member thereby to hermetically close one open side of an interior of the outer cylindrical member, the interior containing therein a grease; and a positioning mechanism that effects a relative axial positioning between the shaft and the inner cylindrical member when the splined cylindrical outer wall of the shaft is inserted through the sleeve member into a given position of the center through bore of the inner cylindrical member.

In accordance with a second aspect of the present invention, there is provided a propeller shaft which comprises an inner cylindrical member having a center through bore, the center through bore having a splined cylindrical inner wall with which a splined cylindrical outer wall of a shaft is engaged; an outer cylindrical member disposed around the inner cylindrical member; a torque transmitting unit installed between the inner and outer cylindrical members to transmit a torque between the inner and outer cylindrical members; a sleeve member coaxially connected to the center through bore of the inner cylindrical member, the sleeve member permitting passage of the splined cylindrical outer wall of the shaft therethrough before effecting the engagement between the splined cylindrical outer wall of the shaft and the splined cylindrical inner wall of the inner cylindrical member; a flexible boot unit having one end fixed to the outer cylindrical member and the other end fixed to the sleeve member thereby to hermetically close one open side of an interior of the outer cylindrical member, the interior containing therein a grease; a seal ring arranged between the sleeve member and the shaft to suppress entry of foreign matter into the center through bore of the inner cylindrical member; and a positioning mechanism that effects a relative axial positioning between the shaft and the inner cylindrical member when the splined cylindrical outer wall of the shaft is inserted through the sleeve member into a given position of the center through bore of the inner cylindrical member.

In accordance with a third aspect of the present invention, there is provided a constant velocity universal joint which comprises an inner cylindrical member having a center through bore, the center through bore having a splined cylindrical inner wall with which a splined cylindrical outer wall of a shaft is engaged; an outer cylindrical member disposed around the inner cylindrical member; a torque transmitting unit installed between the inner and outer cylindrical members to transmit a torque between the inner and outer cylindrical members; a sleeve member coaxially connected to the center through bore of the inner cylindrical member, the sleeve member permitting passage of the splined cylindrical outer wall of the shaft therethrough before effecting the engagement between the splined cylindrical outer wall of the shaft and the splined cylindrical inner wall of the inner cylindrical member; a boot unit having one end fixed to the outer cylindrical member and the other end fixed to the sleeve member thereby to hermetically close one open side of an interior of the outer cylindrical member, the interior containing therein a grease; and a positioning mechanism that effects a relative axial positioning between the shaft and the inner cylindrical member when the splined cylindrical outer wall of the shaft is inserted through the sleeve member into a given position of the center through bore of the inner cylindrical member.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, six embodiments 1a, 1b, 1c, 1d, 1e and 1f of the present invention will be described in detail with reference to the accompanying drawings.

In the following description, various directional terms, such as right, left, upper, lower, rightward and the like are used for ease of explanation. It is however to be noted that such terms are to be understood with respect to only a drawing or drawings on which a corresponding element or portion is shown.

Referring to FIGS. 1 to 4, there is shown a propeller shaft is which is a first embodiment of the present invention.

Figure 4:
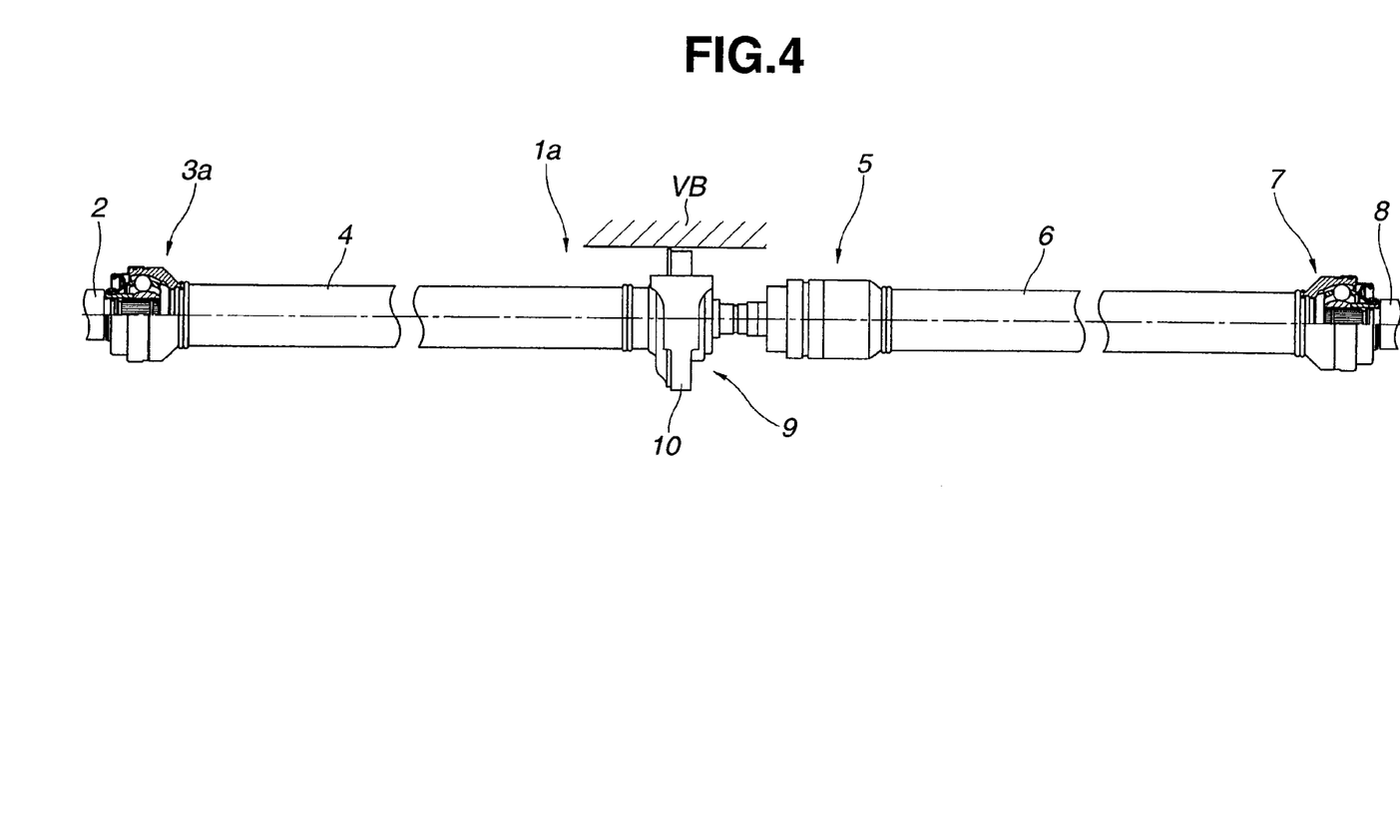
FIG. 4 is a side view of an entire construction of the propeller shaft of the first embodiment of the present invention.

As is seen from FIG. 4, propeller shaft 1a comprises an input shaft 2 of steel that is adapted to connect to an output shaft of a transmission (not shown) mounted on a motor vehicle, a drive shaft 4 of aluminum alloy that is connected to input shaft 2 through a first constant velocity universal joint 3a, a driven shaft 6 of aluminum alloy that is connected to drive shaft 4 through a second constant velocity universal joint 5 and an output shaft 8 of steel that is connected to driven shaft 6 through a third constant velocity universal joint 7 and connected to an input shaft of a differential gear (not shown). As shown, when propeller shaft is practically used, a center bearing 9 holding an axially given portion of propeller shaft is supported by a vehicle body "VB" through a bracket 10. In the illustrated embodiment, center bearing 9 holds a right end of drive shaft 4 at a position near second constant velocity universal joint 5.

Figure 1:
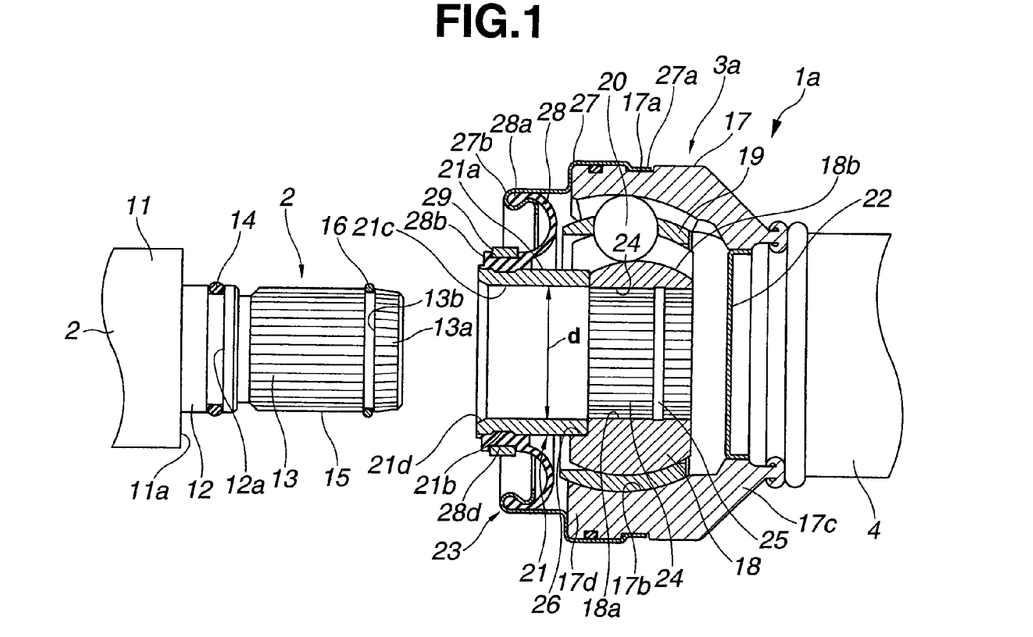
FIG. 1 is a partially sectioned and partially exploded view of a front assembly of a propeller shaft of a first embodiment of the present invention.
Figure 2:
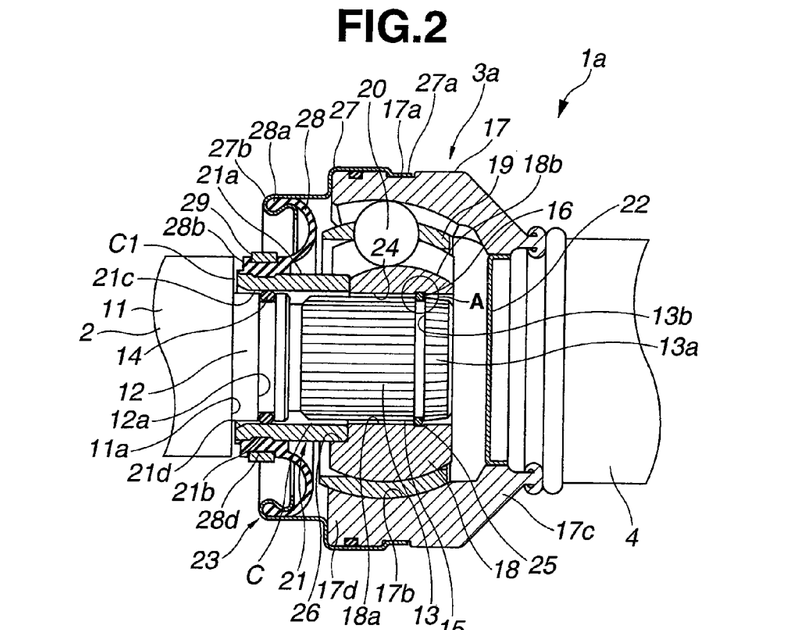
FIG. 2 is a view similar to FIG. 1, but showing a condition in which an input shaft is properly coupled with a constant velocity universal joint to constitute the front assembly of the propeller shaft of the first embodiment.

As is seen from FIGS. 1 and 2, input shaft 2 from the output shaft of a transmission has a stepped right end portion that includes a larger diameter shaft portion 11 with an annular flat surface 11a facing rightward, a medium diameter intermediate portion 12 projected rightward from and integral with larger diameter shaft portion 11 and a smaller diameter right shaft portion 13 projected rightward from and integral with medium diameter intermediate portion 12.

As shown in the drawings, medium diameter intermediate portion 12 is shorter in length than smaller diameter right shaft portion 13. A cylindrical outer surface of medium diameter intermediate portion 12 is formed at an axially middle part thereof with an annular groove 12a and a seal ring 14 made of a synthetic rubber is tightly received in annular groove 12a.

As shown, a cylindrical outer surface of smaller diameter right shaft portion 13 is splined, that is, the cylindrical outer surface is formed with a plurality of axially extending splines 15. As shown, smaller diameter right shaft portion 13 has a tapered right end 13a.

As is seen from FIGS. 1 and 2, an annular groove 13b is formed around a boundary part between tapered right end 13a and a major part of smaller diameter right shaft portion 13. Annular groove 13b has a generally rectangular cross section as is seen from FIG. 3. A snap ring (or circlip) 16 is tightly received in annular groove 13b for the purpose which will be clarified hereinafter.

Figure 3:
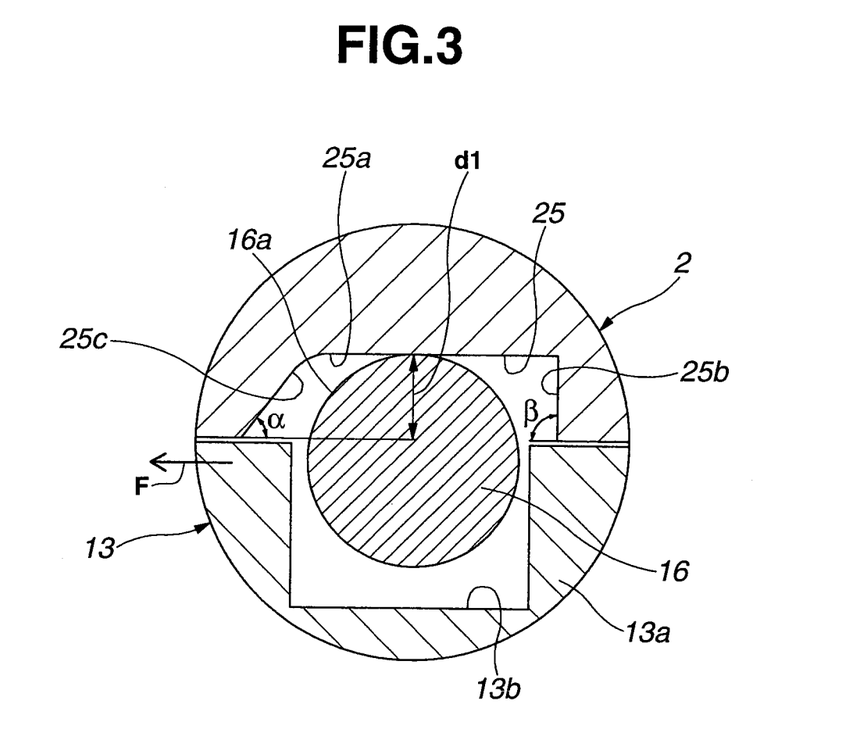
FIG. 3 is an enlarged sectional view of the part enclosed by a circle indicated by an arrow "A" in FIG. 2.

Snap ring 16 is made of a resilient metal and has a generally circular cross section as is seen from FIG. 3. Although not shown in the drawings, snap ring 16 has both ends that are movable relative to each other to vary the diameter of snap ring 16.

As is seen from FIGS. 1 and 2, first constant velocity universal joint 3a is of a fixed type and comprises an outer cylindrical member 17 that has a right end connected to drive shaft 4, an inner cylindrical member 18 that is installed in outer cylindrical member 17 to receive a torque from input shaft 2, a plurality of balls 20 that are rotatably disposed between the two cylindrical members 17 and 18 to serve as a torque transmitting means and a circular cage 19 that rotatably holds balls 20.

As is seen from FIG. 2, outer cylindrical member 17 is shaped like a cup and formed at its outer cylindrical surface with an annular groove 17a. An inner surface 17b of outer cylindrical member 17 is shaped concave so that outer cylindrical member 17 is pivotal about a unit of balls 20. A smaller diameter right end portion 17c of outer cylindrical member 17 is tightly connected to a left end of drive shaft 4.

Within smaller diameter right end portion 17c of outer cylindrical member 17, there is press-fitted a circular seal cap 22, and between a larger diameter front end 17d of outer cylindrical member 17 and an after-mentioned sleeve member 21 which is tightly connected to inner cylindrical member 18, there is arranged an annular boot unit 23.

Inner cylindrical member 18 is made of a steel or the like and formed with a center through bore 18a into which the above mentioned smaller diameter right shaft portion 13 of input shaft 2 is inserted.

Center through bore 18a and right shaft portion 13 are connected through a spline coupling. For this spline coupling, center through bore 18a has a plurality of splines 24 and the right shaft portion 13 of input shaft 2 has a plurality of splines 15.

Inner cylindrical member 18 has a convex outer surface 18b on which balls 20 roll. The splined inner cylindrical wall 24 of center through bore 18a is, at a position near a right end thereof, with an annular groove 25 into which the abovementioned snap ring 16 is tightly received upon proper coupling between input shaft 2 and the universal joint 3a.

As is seen from FIG. 1, sleeve member 21 is made of a steel and press-fitted to a left end of inner cylindrical member 18, so that sleeve member 21 and inner cylindrical member 18 move together like a single unit. For this press-fitting, inner cylindrical member 18 is formed with an annular groove 26 for tightly receiving therein the right end of sleeve member 21, as shown.

If desired, sleeve member 21 may be integral with inner cylindrical member 18.

As is seen from 3, annular groove 25 is shaped to have a generally trapezoidal cross section. A depth "d" of annular groove 25 to a bottom wall 25a is determined about 2/5 of the diameter of snap ring 16. As shown, a right side wall 25b of annular groove 25 is perpendicular (viz., β=90 degrees) to bottom wall 25a and a left side wall 25c of annular groove 25 is inclined about 50 degrees (viz., α=50 degrees) relative to bottom wall 25a.

Accordingly, if a certain force is applied to input shaft 2 in a direction of the arrow "F" causing a leftward movement of the right shaft portion 13 and abutment of snap ring 16 with the inclined left side wall 25c of annular groove 25, snap ring 16 is forced to reduce its diameter permitting disengagement of input shaft 2 from inner cylindrical member 18, particularly from the splined center through bore 18a.

It is thus to be noted that annular groove 13b of input shaft 2, snap ring 16 and annular groove 25 of inner cylindrical member 18 constitute a positioning mechanism through which input shaft 2 can be axially positioned relative to first constant velocity universal joint 3a.

As is seen from FIG. 1, a left end 21d of a smoothed inner cylindrical wall 21c of sleeve member 21 is tapered to facilitate the work for inserting smaller diameter right shaft portion 13 into sleeve member 21.

As is seen from FIG. 2, when the right portion of input shaft 2 is properly and sufficiently led into sleeve member 21, snap ring 16 caught by annular groove 13b becomes engaged with annular groove 25 of the inner cylindrical wall of inner cylindrical member 18. Upon this, positioning of input shaft 2 relative to inner cylindrical member 18 is achieved while forming a thin space "C1" between annular flat surface 11a of input shaft 2 and the left end part of sleeve member 21, as shown. It is to be noted that the space "C1" is used for putting therein a tip of a special pick (not shown) at the time when it is needed to disengage the right end portion of input shaft 2 from sleeve member 21.

The above-mentioned annular boot unit 23 comprises an annular metal retainer 27 that has a right end fixed to outer cylindrical member 17, an annular boot 28 that has a larger diameter outer peripheral portion 28a fixed to a left end of annular metal retainer 27 and a fastening band 29 that is arranged to bind a smaller diameter inner peripheral portion 28b of annular boot 28 to sleeve member 21, as shown.

More specifically, as is seen from FIGS. 1 and 2, annular metal retainer 27 is a stepped member comprising a rightmost base portion 27a that is tightly disposed in an annular groove 17a formed on outer cylindrical member 17 and a leftmost curled end 27b that tightly catches larger diameter end portion 28a of annular boot 28.

Annular boot 28 is made of a rubber or plastic material and constructed to have a generally U-shaped cross section. As shown, when assembled, annular boot 28 is so oriented as to project its swelled portion toward balls 20.

Smaller diameter end portion 28b of annular boot 28 is formed with both an inner annular ridge (no numeral) that is tightly received in an annular groove 21b formed on sleeve member 21 and an outer annular groove 28d that tightly receives the above-mentioned annular band 29.

Due to provision of annular boot unit 23 and circular seal cap 22, a grease can be held in a space defined between outer and inner cylindrical members 17 and 18.

Although first constant velocity universal joint 3a is of a fixed type, it allows a slight swinging between input shaft 2 and drive shaft 4. Second constant velocity universal joint 5 (see FIG. 4) is constructed to permit a relative movement thereof in an axial direction. Thus, the work for assembling propeller shaft 1a to the vehicle body is facilitated.

Third constant velocity universal joint 7 is substantially the same as the above-mentioned first constant velocity universal joint 3a, and thus description on the construction of the joint 7 will be omitted.

In the following, assembling steps for propeller shaft 1a and operation of first constant velocity universal joint 3a will be described with the aid of the drawings.

First, the work for assembling annular boot unit 23 will be described. That is, in a component factory, by using a common method, larger diameter outer peripheral portion 28a of annular boot 28 is connected to annular metal retainer 27 in the above-mentioned manner. Then, the base portion 27a of metal retainer 27 is tightly received in annular groove 17a of outer cylindrical member 17.

Then, smaller diameter inner peripheral portion 28b of annular boot 28 is disposed on the left end of sleeve member 21 and fastening band 29 is disposed on smaller diameter inner peripheral portion 28b of annular boot 28, and fastening band 29 is tightened in a known manner. With this, annular boot unit 23 is properly mounted to first constant velocity universal joint 3a.

In a vehicle body assembling factory, first constant velocity universal joint 3a and input shaft 11 are combined in the following manner.

That is, as is seen from FIGS. 1 and 2, the right shaft portion 13 of input shaft 2 is inserted into sleeve member 21 and then into center through bore 18a of inner cylindrical member 18. During this insertion, snap ring 16 resiliently disposed in annular groove 13b formed on the right shaft portion 13 is forced to slide on and along smoothed inner cylindrical wall 21c of sleeve member 21 and then on and along the splined inner cylindrical wall 24 of inner cylindrical member 18 while being compressed in a direction to reduce its diameter. At a latter stage of this insertion, engagement between splines 15 and 24 is deeply made while receiving a counter force.

Under this sliding, snap ring 16 is kept compressed while pressing its outer portion against the splined inner cylindrical wall 24.

However, as is seen from FIG. 2, when, after travelling in sleeve member 21 and inner cylindrical member 18, the right shaft portion 13 comes to its rightmost position, snap ring 16 is permitted to expand radially outward and engaged with annular groove 25. Upon this, stable connection between input shaft 2 and first constant velocity universal joint 3a is established. It is to be noted that as is seen from FIG. 3, under this engaged condition, snap ring 16 is kept compressed having its outer peripheral part pressed against bottom wall 25a of annular groove 25.

With the above-mentioned assembling steps, input shaft 2 and first constant velocity universal joint 3a are coupled together with the aid of the spline coupling effected by splines 15 and 24 and with the resilient engagement of snap ring 16 with annular groove 25. Of course, under this condition, unexpected disengagement of input shaft 2 from the universal joint 3a is suppressed.

That is, input shaft 2 and the universal joint 3a are operatively connected through the engagement between splines 15 and 24 and the engagement between snap ring 16 and annular groove 25. In other words, in the first embodiment of the invention, for operatively connecting input shaft 2 and the universal joint 3a, no bolts are used. That is, in this first embodiment, a torque transmission from input shaft 2 to drive shaft 4 is assuredly carried out without usage of any connecting bolts.

When smaller diameter right shaft portion 13 is sufficiently inserted into inner cylindrical member 18, snap ring 16 is brought into engagement with annular groove 25. Upon this, further axial movement of the right shaft portion 13 relative to inner cylindrical member 18 and thus relative to outer cylindrical member 17 is suppressed. That is, upon assembling, axial positioning of the right shaft portion 13 of input shaft 2 relative to outer cylindrical member 17 is assured.

As will be understood from the foregoing description, the engagement of snap ring 16 with annular groove 25 is effected by simply pushing input shaft 2 into inner cylindrical member 18. That is, the work for properly connecting input shaft 2 to the universal joint 3a is very easy.

As is seen from FIG. 2, under the condition wherein input shaft 2 is deeply or properly inserted into inner cylindrical member 18, seal ring 14 on medium diameter intermediate portion 12 is pressed against the smoothed inner cylindrical wall of sleeve member 21, and thus, the interior of outer cylindrical member 17 is protected from the entry of muddy water, dusts or the like. Of course, due to provision of seal ring 14, leakage of the grease from the interior of outer cylindrical member 17 is suppressed.

Furthermore, since seal ring 14 is tightly held by annular groove 12a of the cylindrical outer surface of the intermediate portion 12 and arranged to seal an entirely outer surface of the intermediate portion 12 for its sealing area, seal ring 14 can exhibit a satisfied sealing performance.

Furthermore, since snap ring 16 is placed in the interior of outer cylindrical member 17 while keeping away from seal ring 14, snap ring 16 is sufficiently fed with the grease from the interior of outer cylindrical member 17, which suppresses corrosion of snap ring 16.

As is described hereinabove, in this first embodiment, the connection between input shaft 2 and first constant velocity universal joint 3a is made through the engagement between splines 15 and 24 and the catching or holding function of snap ring 16 without usage of conventional bolts. Accordingly, in this embodiment, reduction in component count is delivered and thus weight reduction of propeller shaft 1a and efficient assembly operations for vehicles are achieved. Furthermore, because of presence of seal ring 14, the above-mentioned dust-tight and grease holding performance is obtained.

Furthermore, as will be understood from FIG. 1, due to provision of tapered end 13a of smaller diameter shaft portion 13 and the tapered peripheral inner edge 21d of sleeve member 21, the shaft portion 13 of input shaft 2 can be easily guided into sleeve member 21 of the universal joint 3a, which brings about an easy and instant coupling between input shaft 2 and the joint 3a.

As will be understood from FIG. 2, when it is needed to disengage input shaft 2 from the universal joint 3a, a special pick (not shown) is handled to put its tip into the thin space "C1" provided between annular flat surface 11a of input shaft 2 and the left end of sleeve member 21 and then the pick is pivoted in a certain direction using an outer end of annular flat surface 11a as a fulcrum. With these steps, input shaft 2 is displaced leftward in the direction of "F" in FIG. 3 together with snap ring 16.

Due to this leftward movement, snap ring 16 is brought into abutment with the inclined left side wall 24c of annular groove 25 and thus thereafter, the diameter of snap ring 16 is gradually reduced as snap ring 16 slides down on and along the inclined left side wall 25c in accordance with the leftward movement of input shaft 2. Once the leftward movement comes to a certain level, the diameter of snap ring 16 becomes sufficiently small to unlock the engagement between input shaft 2 and sleeve member 21, and thus, thereafter, input shaft 2 is instantly disengaged from first constant velocity universal joint 3a.

Figure 5:
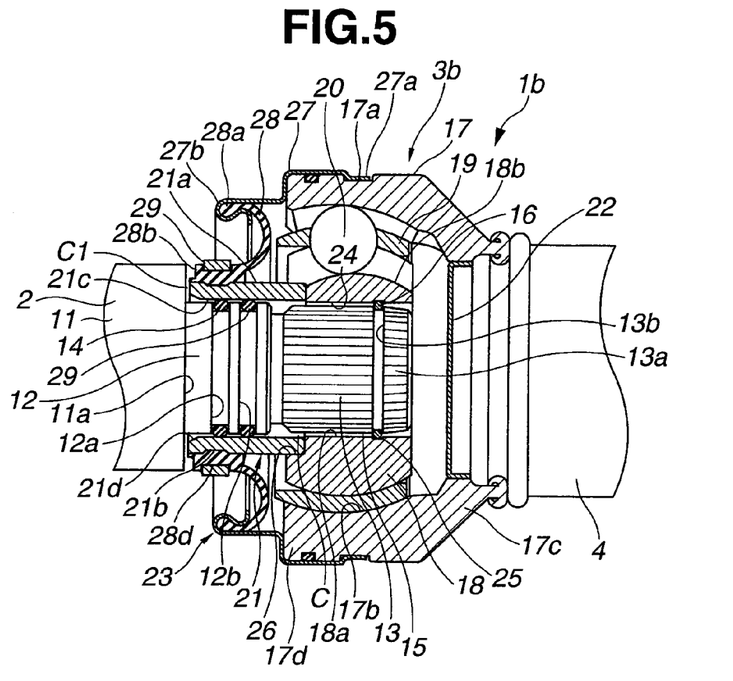
FIG. 5 is a view similar to FIG. 2, but showing an essential part of a front assembly of a propeller shaft of a second embodiment of the present invention.

Referring to FIG. 5, there is shown a front assembly of a propeller shaft 1b which is a second embodiment of the present invention.

Since this second embodiment is similar to the above-mentioned first embodiment, only parts or portions that are different from those of the first embodiment will be described in the following.

As is seen from FIG. 5, in this second embodiment, in addition to annular groove 12a, another annular groove (viz., second annular groove) 12b is provided by medium diameter intermediate portion 12 of input shaft 2. A second seal ring 29 is tightly held by second annular groove 12b. Like the seal ring 14, second seal ring 29 is pressed against the smoothed cylindrical inner surface of sleeve member 21.

Because of usage of two seal rings 14 and 29, much effective sealing against muddy water, dusts or the like is obtained in this embodiment. Furthermore, due to provision of such two seal rings 14 and 29, undesired leakage of the grease from the interior of outer cylindrical member 17 to the outside is much assuredly suppressed.

Figure 6:
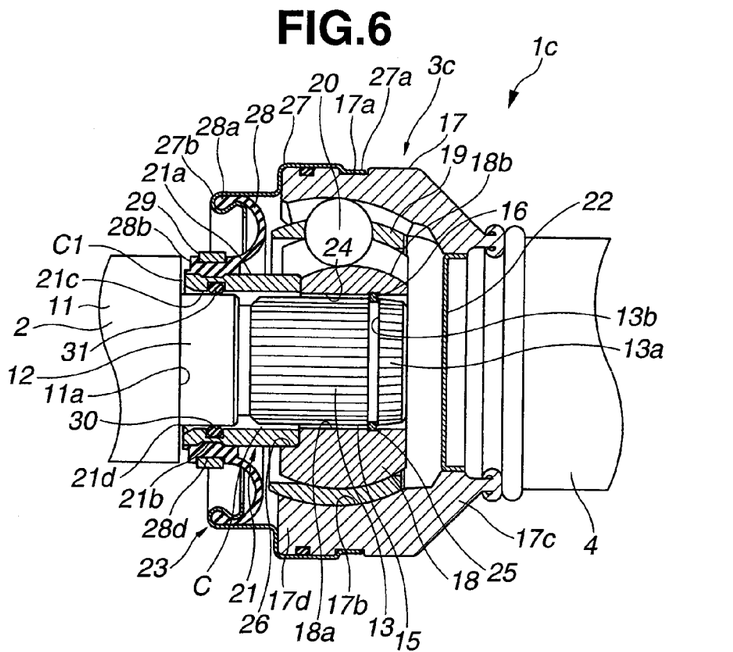
FIG. 6 is a view similar to FIG. 2, but showing an essential part of a front assembly of a propeller shaft of a third embodiment of the present invention.

Referring to FIG. 6, there is shown a front assembly of a propeller shaft 1c which is a third embodiment of the present invention.

In this third embodiment, the axial length of medium diameter intermediate portion 12 of input shaft 2 is small as compared with those of the above-mentioned first and second embodiments.

Furthermore, in this third embodiment, a seal ring 31 is tightly received in an annular groove 30 that is formed on the smoothed inner cylindrical wall of sleeve member 21. In use, seal ring 31 is pressed against the cylindrical outer surface of medium diameter intermediate portion 12 of input shaft 2.

Figure 7:
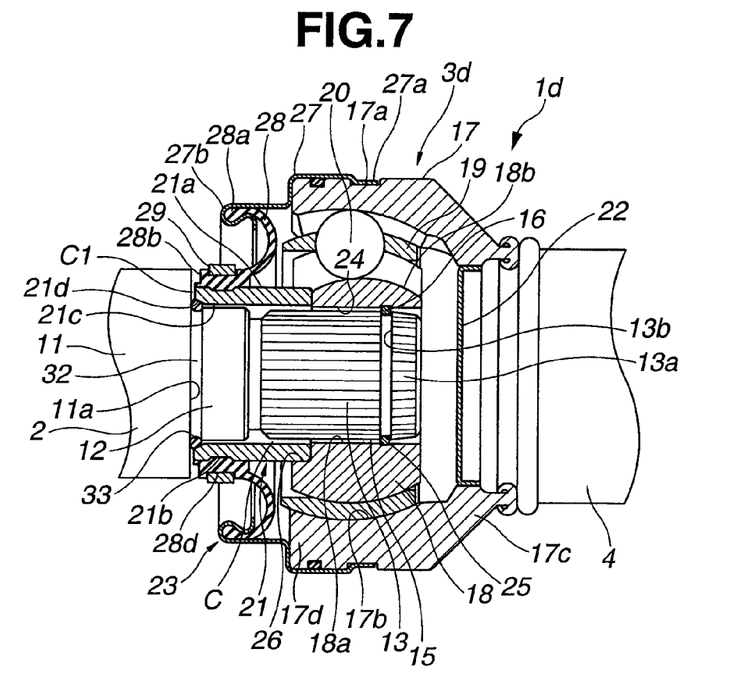
FIG. 7 is a view similar to FIG. 2, but showing an essential part of a front assembly of a propeller shaft of a fourth embodiment of the present invention.

Referring to FIG. 7, there is shown a front assembly of a propeller shaft id which is a fourth embodiment of the present invention.

In this fourth embodiment, an annular groove 32 is formed on and around a root portion of medium diameter intermediate portion 12 of input shaft 2, and a seal ring 33 is tightly received in annular groove 32. That is, when the right shaft portion 13 of input shaft 2 is properly set in inner cylindrical member 18, seal ring 33 is compressed between annular flat surface 11a of input shaft 2 and the tapered left end 21d of sleeve member 21, as shown.

With provision of seal ring 33, the clearance "C1" is directly sealed, and thus the interior of outer cylindrical member 17 is protected from the entry of muddy water, dusts or the like.

Figure 8:
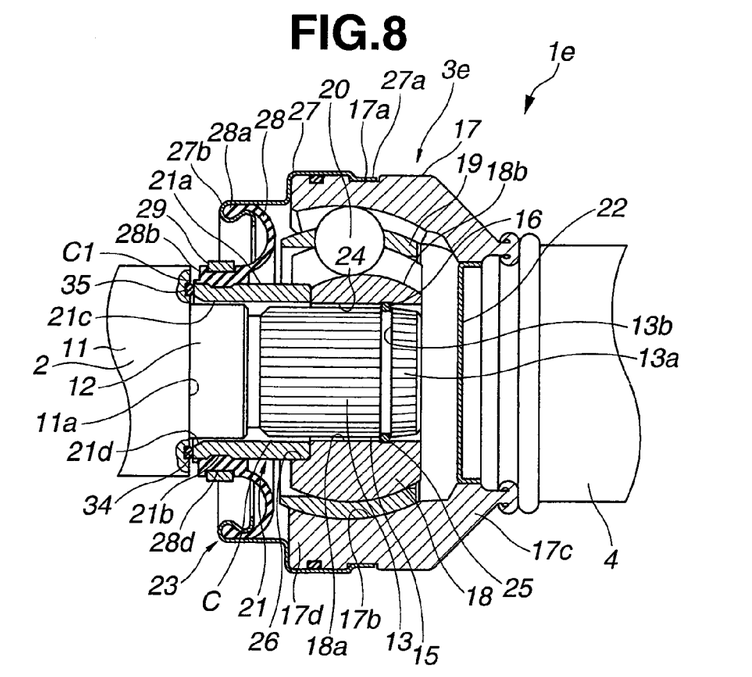
FIG. 8 is a view similar to FIG. 2, but showing an essential part of a front assembly of a propeller shaft of a fifth embodiment of the present invention.

Referring to FIG. 8, there is shown a front assembly of a to propeller shaft 1e which is a fifth embodiment of the present invention.

In this fifth embodiment, an annular groove 34 is formed on annular flat surface 11a of input shaft and a seal ring 35 is tightly received in annular groove 34. That is, when the right shaft portion 13 of input shaft 2 is properly set in inner cylindrical member 18, seal ring 35 is compressed between a bottom wall of annular groove 34 and the left end of sleeve member 21, as shown.

Like in the above-mentioned fourth embodiment, the clearance "C1" is directly sealed, and thus, the interior of outer cylindrical member 17 is protected from the entry of muddy water, dusts or the like.

Figure 9:
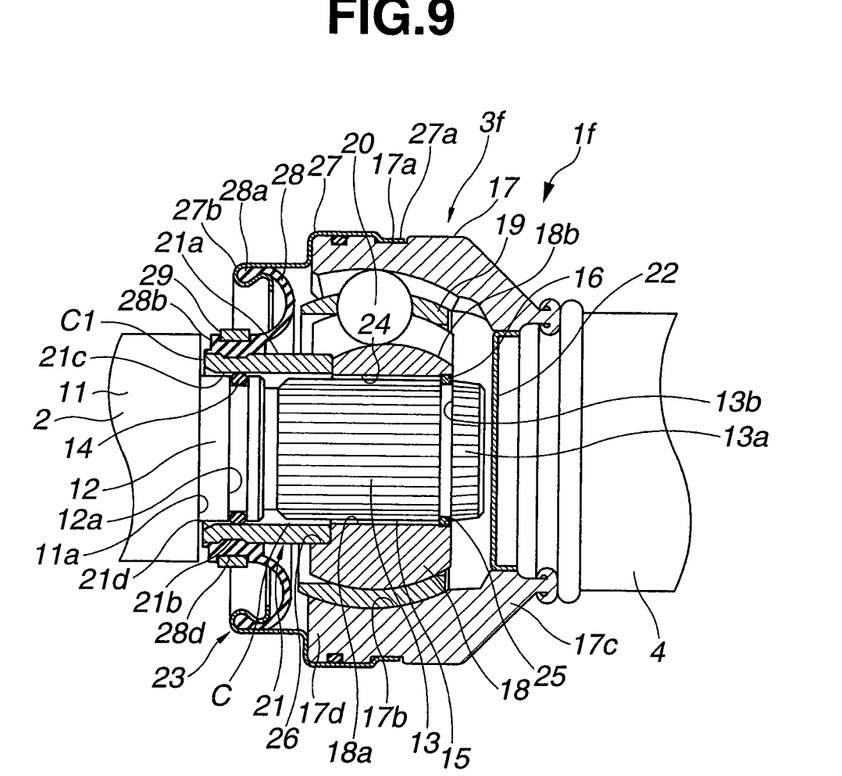
FIG. 9 is a view similar to FIG. 2, but showing an essential part of a front assembly of a propeller shaft of a sixth embodiment of the present invention.

Referring to FIG. 9, there is shown a front assembly of a propeller shaft if which is a sixth embodiment of the present invention.

In this sixth embodiment, the axial length of the smaller diameter right shaft portion 13 of input shaft 2 is longer than those of the above-mentioned embodiments. Thus, annular groove 25 used for limiting the axial movement of the right shaft portion 13 is placed at the right end of the center through bore 18a of inner cylindrical member 18.

Due to the longer construction of the right shaft portion 13, the mechanical strength of the portion 13 is increased and the engagement between splines 15 and 24 is much effectively made.

The entire contents of Japanese Patent Application 2012-66120 filed Mar. 22, 2012 are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. A propeller shaft comprising:
   an inner cylindrical member having a center through bore, the center through bore having a splined cylindrical inner wall with which a splined cylindrical outer wall of a shaft is engaged;
   an outer cylindrical member disposed around the inner cylindrical member;
   a torque transmitting unit installed between the inner and outer cylindrical members to transmit a torque between the inner and outer cylindrical members;
   a sleeve member coaxially connected to the center through bore of the inner cylindrical member, the sleeve member permitting passage of the splined cylindrical outer wall of the shaft therethrough before effecting the engagement between the splined cylindrical outer wall of the shaft and the splined cylindrical inner wall of the inner cylindrical member;
   a boot unit having one end fixed to the outer cylindrical member and the other end fixed to the sleeve member thereby to hermetically close one open side of an interior of the outer cylindrical member, the interior containing therein a grease; and
   a positioning mechanism that effects a relative axial positioning between the shaft and the inner cylindrical member when the splined cylindrical outer wall of the shaft is inserted through the sleeve member into a given position of the center through bore of the inner cylindrical member leaving a cylindrical clearance between an inner cylindrical wall of the sleeve member and the shaft, the cylindrical clearance being closed by a seal ring for suppressing entry of foreign matter into the center through bore of the inner cylindrical member, wherein the positioning mechanism is arranged between the center through bore of the inner cylindrical member and the shaft, and comprises:
     a first annular groove formed on the splined cylindrical inner wall of the inner cylindrical member; and
     a second annular groove formed on the splined cylindrical outer wall of the shaft, the second annular groove receiving therein a snap ring, the snap ring being engageable with the first annular groove when the splined cylindrical outer wall of the shaft is inserted into the given position of the center through bore of the inner cylindrical member; and wherein the sleeve member is formed with a smoothed inner cylindrical wall, and in which the seal ring is compressed between the smoothed inner cylindrical wall of the sleeve member and a cylindrical outer wall of the shaft.

2. A propeller shaft as claimed in claim 1, in which the seal ring is disposed and compressed in the cylindrical clearance between the cylindrical inner wall of the sleeve member and the cylindrical outer wall of the shaft.

3. A propeller shaft as claimed in claim 2, in which the positioning mechanism is arranged between the center through bore of the inner cylindrical member and the shaft.

4. A propeller shaft as claimed in claim 2, in which the seal ring comprises a plurality of seal ring members that are axially arranged.

5. A propeller shaft as claimed in claim 1, in which the seal ring is placed between one axial end of the sleeve member and an end of a larger diameter portion of the shaft that faces the axial end of the sleeve member.

6. A propeller shaft comprising:
   an inner cylindrical member having a center through bore, the center through bore having a splined cylindrical inner wall with which a splined cylindrical outer wall of a shaft is engaged;
   an outer cylindrical member disposed around the inner cylindrical member;
   a torque transmitting unit installed between the inner and outer cylindrical members to transmit a torque between the inner and outer cylindrical members;
   a sleeve member coaxially connected to the center through bore of the inner cylindrical member, the sleeve member permitting passage of the splined cylindrical outer wall of the shaft therethrough before effecting the engagement between the splined cylindrical outer wall of the shaft and the splined cylindrical inner wall of the inner cylindrical member;
   a boot unit having one end fixed to the outer cylindrical member and the other end fixed to the sleeve member thereby to hermetically close one open side of an interior of the outer cylindrical member, the interior containing therein a grease; and
   a positioning mechanism that effects a relative axial positioning between the shaft and the inner cylindrical member when the splined cylindrical outer wall of the shaft is inserted through the sleeve member into a given position of the center through bore of the inner cylindrical member leaving a cylindrical clearance between an inner cylindrical wall of the sleeve member and the shaft, the cylindrical clearance being closed by a seal ring for suppressing entry of foreign matter into the center through bore of the inner cylindrical member, wherein the positioning mechanism is arranged between the center through bore of the inner cylindrical member and the shaft, and comprises:
     a first annular groove formed on the splined cylindrical inner wall of the inner cylindrical member; and
     a second annular groove formed on the splined cylindrical outer wall of the shaft, the second annular groove receiving therein a snap ring, the snap ring being engageable with the first annular groove when the splined cylindrical outer wall of the shaft is inserted into the given position of the center through bore of the inner cylindrical member, and wherein the shaft comprises a larger diameter shaft portion and a smaller diameter shaft portion that extends from the larger diameter shaft portion, and in which the seal ring is compressed between a root part of the smaller diameter shaft portion and the sleeve member.

7. A propeller shaft comprising:

an inner cylindrical member having a center through bore, the center through bore having a splined cylindrical inner wall with which a splined cylindrical outer wall of a shaft is engaged;

an outer cylindrical member disposed around the inner cylindrical member;

a torque transmitting unit installed between the inner and outer cylindrical members to transmit a torque between the inner and outer cylindrical members;

a sleeve member coaxially connected to the center through bore of the inner cylindrical member, the sleeve member permitting passage of the splined cylindrical outer wall of the shaft therethrough before effecting the engagement between the splined cylindrical outer wall of the shaft and the splined cylindrical inner wall of the inner cylindrical member;

a boot unit having one end fixed to the outer cylindrical member and the other end fixed to the sleeve member thereby to hermetically close one open side of an interior of the outer cylindrical member, the interior containing therein a grease; and a positioning mechanism that effects a relative axial positioning between the shaft and the inner cylindrical member when the splined cylindrical outer wall of the shaft is inserted through the sleeve member into a given position of the center through bore of the inner cylindrical member leaving a cylindrical clearance between an inner cylindrical wall of the sleeve member and the shaft, the cylindrical clearance being closed by a seal ring for suppressing entry of foreign matter into the center through bore of the inner cylindrical member, wherein the positioning mechanism is arranged between the center through bore of the inner cylindrical member and the shaft, and comprises:

a first annular groove formed on the splined cylindrical inner wall of the inner cylindrical member; and a second annular groove formed on the splined cylindrical outer wall of the shaft, the second annular groove receiving therein a snap ring, the snap ring being engageable with the first annular groove when the splined cylindrical outer wall of the shaft is inserted into the given position of the center through bore of the inner cylindrical member; and wherein the seal ring is fitted in an annular groove formed in either one of the outer cylindrical wall of the shaft and an inner cylindrical wall of the sleeve member.

8. A propeller shaft comprising:

an inner cylindrical member having a center through bore, the center through bore having a splined cylindrical inner wall with which a splined cylindrical outer wall of a shaft is engaged;

an outer cylindrical member disposed around the inner cylindrical member;

a torque transmitting unit installed between the inner and outer cylindrical members to transmit a torque between the inner and outer cylindrical members;

a sleeve member coaxially connected to the center through bore of the inner cylindrical member, the sleeve member permitting passage of the splined cylindrical outer wall of the shaft therethrough before effecting the engagement between the splined cylindrical outer wall of the shaft and the splined cylindrical inner wall of the inner cylindrical member;

a flexible boot unit having one end fixed to the outer cylindrical member and the other end fixed to the sleeve member thereby to hermetically close one open side of an interior of the outer cylindrical member, the interior containing therein a grease;

a seal ring arranged between the sleeve member and the shaft to suppress entry of foreign matter into the center through bore of the inner cylindrical member; and a positioning mechanism that effects a relative axial positioning between the shaft and the inner cylindrical member when the splined cylindrical outer wall of the shaft is inserted through the sleeve member into a given position of the center through bore of the inner cylindrical member in which the positioning mechanism comprises:

a first annular groove formed on the splined cylindrical inner wall of the inner cylindrical member;

a second annular groove formed on the splined cylindrical outer wall of the shaft; and a snap ring tightly received in the second annular groove, the snap ring being brought into engagement with the first annular groove when the splined cylindrical outer wall of the shaft is inserted into the given position of the center through bore of the inner cylindrical member, in which the seal ring is disposed and compressed in a cylindrical clearance defined between the cylindrical inner wall of the sleeve member and the cylindrical outer wall of the shaft, in which the sleeve member is formed with a smoothed inner cylindrical wall, in which the seal ring is compressed between the smoothed inner cylindrical wall of the sleeve member and a cylindrical outer wall of the shaft, and in which the positioning mechanism is arranged between the center through bore of the inner cylindrical member and the shaft.

* * * * *